United States Patent [19]

Cowley

[11] 4,366,120
[45] Dec. 28, 1982

[54] SMALL SCALE CHLORINE DIOXIDE PLANT

[75] Inventor: Gerald Cowley, Mississauga, Canada

[73] Assignee: Erco Industries Limited, Islington, Canada

[21] Appl. No.: 181,766

[22] Filed: Aug. 27, 1980

Related U.S. Application Data

[62] Division of Ser. No. 143,888, Apr. 25, 1980, Pat. No. 4,250,159.

[30] Foreign Application Priority Data

May 31, 1979 [GB] United Kingdom ............... 7919026

[51] Int. Cl.³ .................. G05D 9/00; G05D 10/00; G05B 9/00; B01J 8/00
[52] U.S. Cl. ............................... 422/106; 422/112; 422/117; 422/187
[58] Field of Search ............ 422/117, 106, 109, 111, 422/112, 187, 198, 168, 173, 175, 62; 423/477, 480; 23/230 A

[56] References Cited

U.S. PATENT DOCUMENTS

| | | | |
|---|---|---|---|
| 2,598,087 | 5/1952 | Wayman et al. | 423/480 |
| 2,710,246 | 6/1955 | Marks et al. | 423/480 |
| 2,895,801 | 7/1959 | Northgraves et al. | 423/480 |
| 3,627,275 | 12/1971 | Gusmer | 422/135 |
| 3,864,456 | 2/1975 | Winfield et al. | 423/478 |
| 4,105,751 | 8/1978 | Caillol | 423/480 |
| 4,190,620 | 2/1980 | Vanderspurt et al. | 422/187 |

FOREIGN PATENT DOCUMENTS

| | | | |
|---|---|---|---|
| 757426 | 10/1970 | Belgium | 423/477 |
| 2031613 | 4/1980 | United Kingdom | 423/477 |

*Primary Examiner*—Frank W. Lutter
*Assistant Examiner*—Chris Konkol
*Attorney, Agent, or Firm*—Sim & McBurney

[57] ABSTRACT

Chlorine dioxide solution for use in waste water treatment is produced in an automated small scale plant wherein sodium chlorate solution is reacted with sulphur dioxide at subatmospheric pressure by countercurrent flow in a reaction tower. Water ejectors are used to withdraw gaseous chlorine dioxide from the upper end of the tower and form therefrom chlorine dioxide solution and also to withdraw liquid effluent from the bottom of the tower for discharge. The plant is fully automated to form chlorine dioxide solution in response to inventory requirements. The chlorine dioxide-producing reaction is only permitted to operate if each of a plurality of sensed parameters is within predetermined ranges.

1 Claim, 3 Drawing Figures

SMALL SCALE CHLORINE DIOXIDE PLANT

This is a division of application Ser. No. 143,888 filed Apr. 25, 1980 now U.S. Pat. No. 4,250,159.

FIELD OF INVENTION

The present invention relates to the production of aqueous chlorine dioxide solution, more particularly to the automated small scale production of chlorine dioxide for use in waste water treatment.

BACKGROUND OF THE INVENTION

The use of chlorine dioxide in the treatment of waste water for disinfection is well known and is known to have advantages over the use of chlorine. Relatively small quantities of chlorine dioxide are required in such use, typically 500 to 2000 lbs/day in a municipal sewage treatment plant of a medium-sized community.

SUMMARY OF INVENTION

The present invention provides a process for the production of aqueous chlorine dioxide solution for use in waste water treatment. A modular automated plant which is inherently safe and requires only limited maintenance and hence is suitable for operation by non-skilled and semiskilled personnel is used in a preferred embodiment of the invention.

In accordance with the present invention, an aqueous solution of sodium chlorate flows downwardly in a tower countercurrent to up-flowing gaseous sulphur dioxide to cause the formation of chlorine dioxide, the tower is maintained under a subatmospheric pressure to prevent leakage of chlorine dioxide and to remove chlorine dioxide from the tower, and the chlorine dioxide is dissolved in water to form an aqueous chlorine dioxide solution.

Concentrations of chlorine dioxide of about 1 to 3 g/l preferably are present in the product solution in order to minimize loss from the solution on storage and to avoid any requirement for chilled water in the dissolving step.

Operation of the procedure is preferably automated, whereby, in response to demand for chlorine dioxide solution, as a result of sensed low inventory or of manual actuation, a specific sequence of safety checks first is effected and thereafter a specific sequence of start-up steps takes place so that chlorine dioxide solution production is initiated. During production, safety checks are maintained, so that shutdown can be initiated if predetermined safety limits are exceeded. Once the required demand for chlorine dioxide solution has been met, shutdown is effected and the various solution and gas flow lines are purged.

DESCRIPTION OF PREFERRED EMBODIMENT

Figure 1:
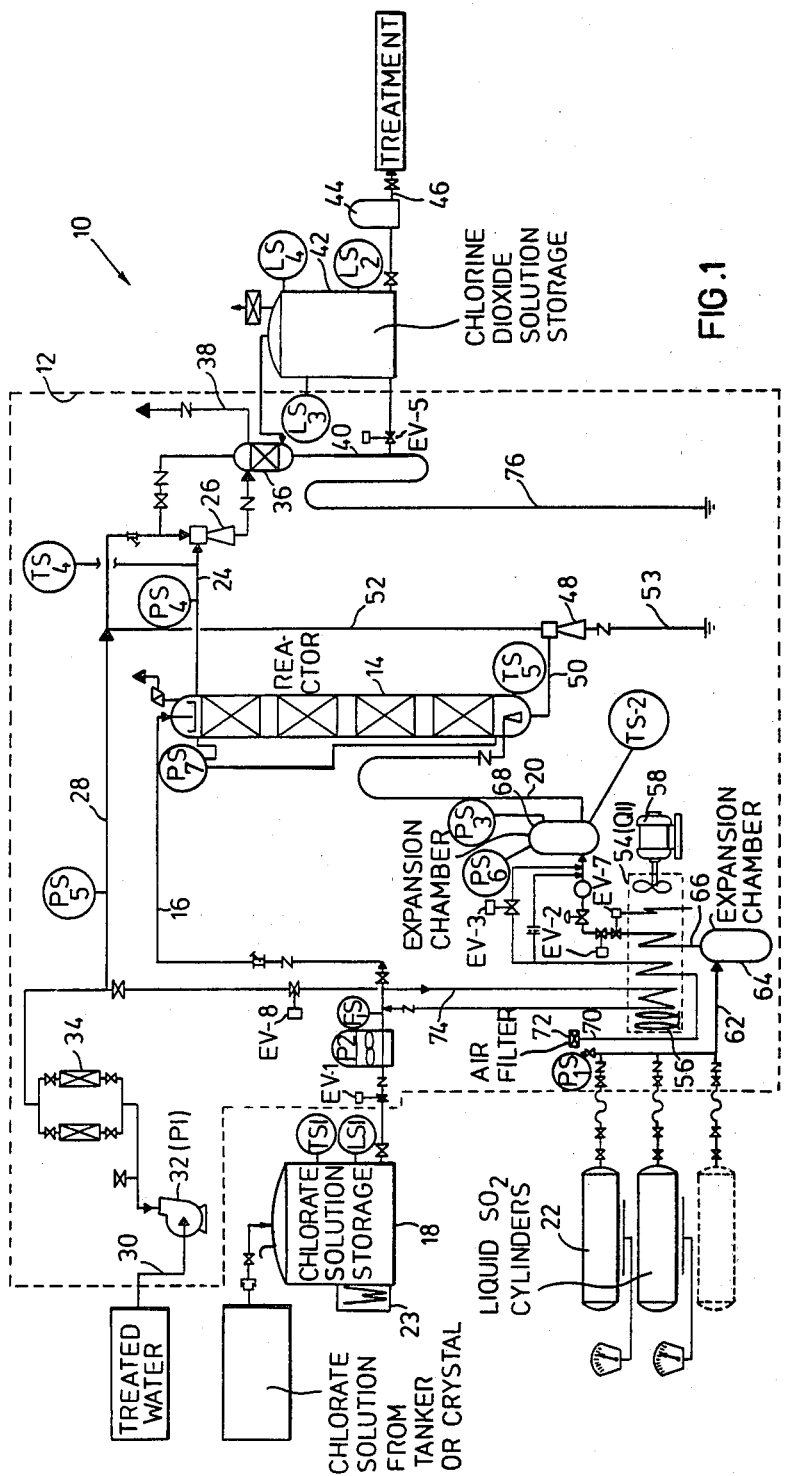
FIG. 1 is a schematic flow sheet of the production of aqueous chlorine dioxide solution in accordance with one embodiment of the invention.
Figure 2:
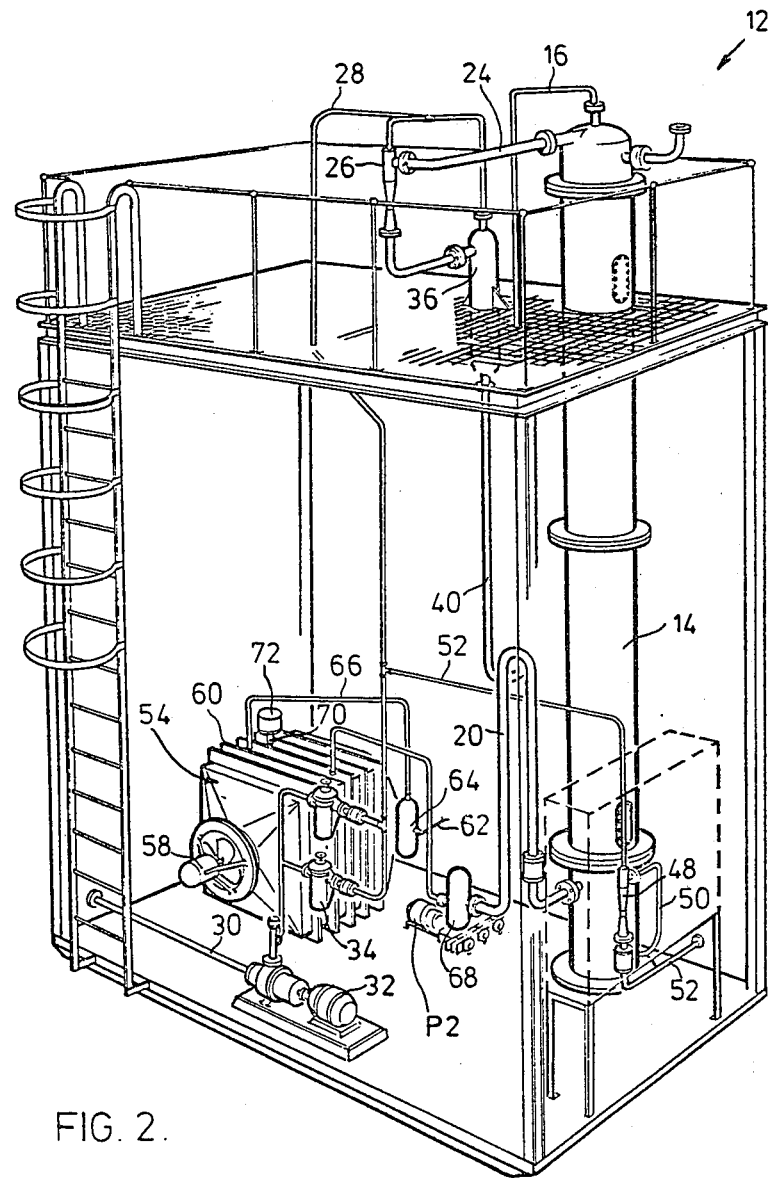
FIG. 2 is a schematic perspective view of the self-contained module and the physical elements thereof used in the procedure of FIG. 1.

Referring first to FIGS. 1 and 2, a chlorine dioxide solution-producing plant 10 comprises a self-contained module 12, a plurality of external feeds thereto and external storage for aqueous chlorine dioxide solution. A tubular reaction tower 14 is provided in the module and chlorine dioxide is produced therein. In the embodiment of FIG. 1, chlorine dioxide is produced by a modification of the so-called "Rapson-Wayman" process which is fully described in U.S. Pat. No. 2,598,087.

In the Rapson-Wayman process, chlorine dioxide, substantially free from gaseous chlorine, is formed by reaction of sodium chlorate with sulphur dioxide in accordance with the equation:

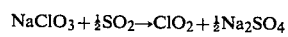

The reaction is effected at a high total acid normality of about 9.5 to 11. This chlorine dioxide-producing process is somewhat inefficient in conversion of sodium chlorate to chlorine dioxide and forms sulphuric acid as a by-product, but nevertheless is used in this invention in view of its simplicity of operation and low capital and operating costs.

In the reaction tower 14, sodium chlorate solution, which is fed by line 16 to the top thereof from an aqueous sodium chlorate solution storage tank 18 located externally of the module 12, flows downwardly and countercurrently contacts rising sulphur dioxide gas, which is fed to the bottom of the tower 14 by line 20 from liquified sulphur dioxide storage cylinders 22 located externally of the module 12. The reaction between the sulphur dioxide and sodium chlorate is effected mainly in the lower portion of the reaction tower 14. The manner of gasification of the sulphur dioxide for feed to the reaction tower 14 is discussed below. The sodium chlorate solution usually contains a small quantity of sodium chloride to aid in initiation of the production of chlorine dioxide, such as, about 0.1 wt% of sodium chloride (as chloride) based on the weight of sodium chlorate crystals.

The sodium chlorate solution is heated in the storage tank 18 by a convenient heating device 23 associated with the tank. The temperature of the sodium chlorate solution in the storage tank 18 is maintained above about 50° C. up to about 55° C., to permit the chlorine dioxide-producing reaction to be effected at an elevated temperature of about 50° to about 80° C., preferably about 50° to about 60° C., with similarly heated sulphur dioxide in the reaction tower 14.

Chlorine dioxide is removed from the top of the reaction tower 14 by line 24 under the influence of a water ejector 26 which also maintains the tower 14 under a subatmospheric pressure of about 80 to about 100 mm Hg. The value of the subatmospheric pressure at any given reaction temperature should be above the pressure at which the reaction liquor boils.

The subatmospheric pressure ensures that the partial pressure of chlorine dioxide is well below that at which spontaneous decomposition occurs. In addition, the subatmospheric pressure prevents leakage of noxious gases in the event of equipment malfunction.

The water ejector 26 is fed by water in line 28 from a feed line 30 external to the module 12 through a pump 32 and filters 34. The water dissolves the chlorine dioxide gas and any residual air is separated from the solution in an absorption tower 36. Separated air is vented to atmosphere by line 38.

The resulting chlorine dioxide solution is forwarded by line 40 to a chlorine dioxide solution storage tank 42 located externally of the module 12. The chlorine dioxide solution may be pumped from the storage tank 42 by pump 44 to a waste water treatment location by line 46.

The water ejector 26 is sized and the flow rate of water thereto is controlled not only to provide the desired subatmospheric pressure but also to produce a relatively low concentration of dissolved chlorine dioxide in the solution, usually less than about 3 g/l, typically about 1 to 3 g/l. At such concentrations, chilled water is not required to effect complete dissolution of the chlorine dioxide and ambient temperatures of about 5° to about 25° C. may be used. In addition, since the concentration of chlorine dioxide in the solution is well below the saturation level, continuous scrubbing of storage tank vent gases is not required, another factor contributing to the overall simplicity and safety of the system.

The countercurrent flow of the sodium chlorate and sulphur dioxide in the reaction tower 14 also produces a liquid effluent comprising sulphuric acid containing dissolved sodium sulphate. This liquid effluent may be recycled from the lower end of the tower 14 to a point part-way up the tower 14 to increase the efficiency of utilization of the chemicals.

The liquid effluent stream is removed from the bottom of the reaction tower 14 by the use of a second water ejector 48 connected thereto by line 50. The water ejector 48 is fed by line 52 from the external feed line 30 in parallel to the water feed in line 28 to the first water ejector 26. The second water ejector 48 serves to withdraw the liquid effluent from the base of the tower 14 and dilute the same for disposal by line 52. The dilute sulphuric acid effluent stream in line 52 may be put to a variety of uses in waste disposal and may be used in the manufacture of alum.

A compact heater device 54 is provided comprising heater elements 56 and a fan 58 to draw air over the heater elements into heat exchange contact with three fin tube radiator blanks 60. The heater device 54 is used mainly for heating sulphur dioxide passing through one of the radiator banks 60 to an elevated temperature of above about 50° C. up to about 60° C., to permit the chlorine dioxide-producing reaction to be effected at elevated temperature with the similarly heated sodium chlorate solution, as described above. The heater device 54 also heats purge air and purge water passing through the other two radiator banks 60.

The sulphur dioxide is fed as liquid from one of the external cylinders 22 into feed line 62 and into a first expansion chamber 64 for vaporization therein. The vaporized sulphur dioxide then passes by line 66 into heat exchange relationship with the heater 54 and thence to a second expansion chamber 68 to form the feed in line 20.

An air purge line 70 passes in heat exchange relation with the heater 54 from a filter 72 communicating with atmosphere to the sulphur dioxide feed line 66 downstream of the heater 54 and upstream of the second expansion chamber 68.

A water purge line 74 is connected between the downstream side of the filters 34 and the sodium chlorate solution feed line 16 and passes in heat exchange relationship with the heater 54. The purpose of the purge lines 70 and 74 will become more apparent below when the operation of the plant 10 is described.

OPERATION

Figure 3:
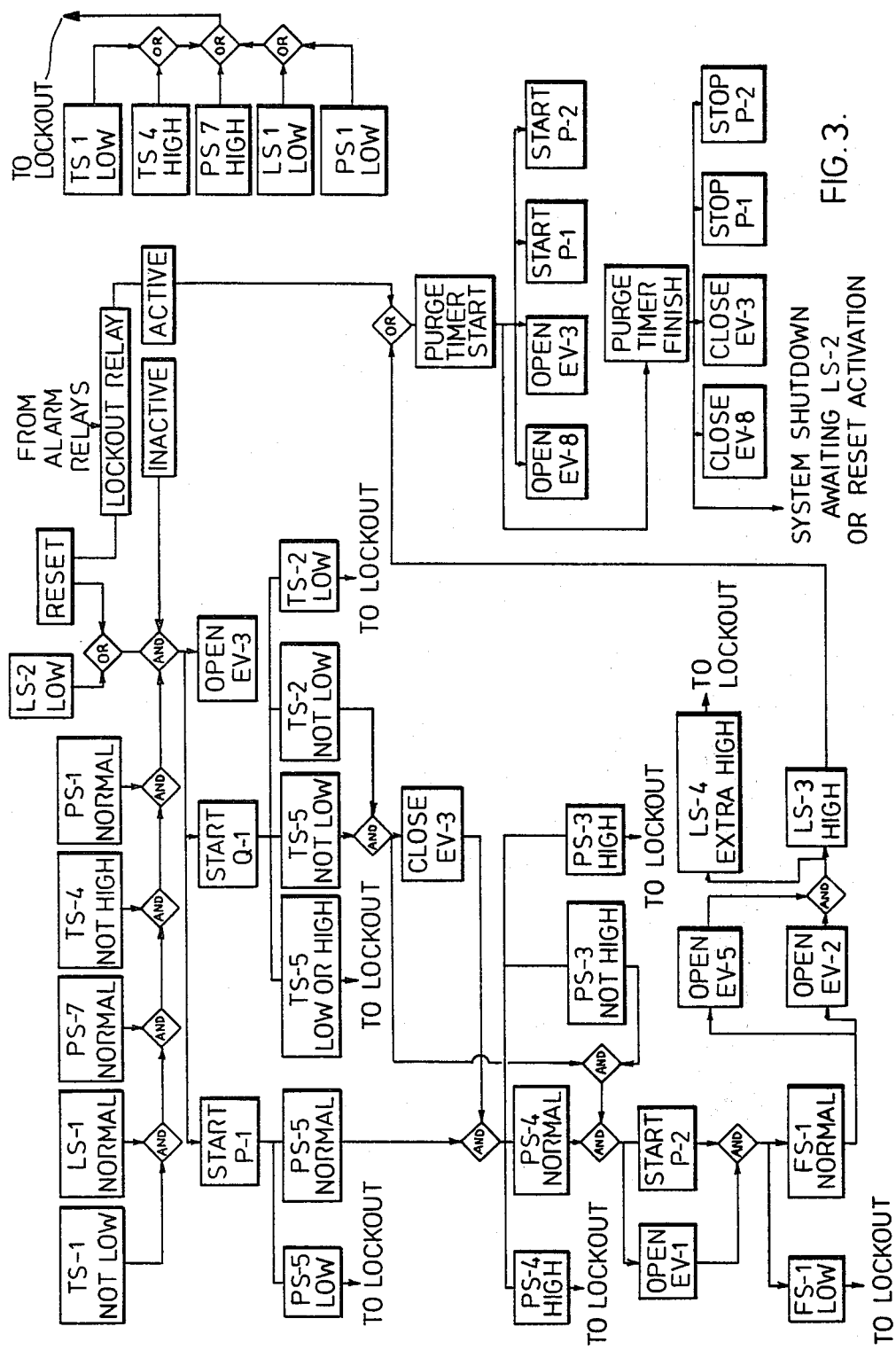
FIG. 3 is a logic flow diagram of the automatic operations of the chlorine dioxide solution-producing procedure illustrated in FIG. 1.

In operation, the plant 10 sequences in accordance with a predetermined series of steps outlined in the logic flow diagram of FIG. 3. The operation will be described with respect thereto.

Initiation of the formation of chlorine dioxide solution may be effected manually or in response to a low level of chlorine dioxide solution in the storage tank 42 sensed by a level sensor LS-2. Such a low level of inventory of chlorine dioxide solution normally corresponds to about 15% of the storage capacity of the tank 42, typically constituting about 30 minutes supply of chlorine dioxide solution at the maximum rate of flow attainable by the pump 44.

Sensed values for certain parameters are checked in turn by suitable sensors to ensure they are within allowable limits prior to further operation. The following are the parameters checked, their "normal" values and the sensor used:

| | | |
|---|---|---|
| Sodium chlorate solution temperature in tank 18 | not less than 50° C. | TS-1 |
| Sodium chlorate inventory level in tank 18 | greater than 20% of maximum inventory | LS-1 |
| Reactor (14) differential pressure (top to bottom) | less than 25 mm Hg | PS-7 |
| Off-gas temperature in line 24 | not more than 60° C. (normally less than 40° C.) | TS-4 |
| Sulphur dioxide inventory | greater than 20 psig (normally greater than 40 psig) | PS-1 |

In the event that any of the above parameters is outside the allowable limit the plant shuts down automatically and requires manual reset after correction of the defective parameter.

Assuming these parameters to be within their required limits, the start-up sequence is initiated. The heater 54 (Q1) is activated and an air valve EV-3 located in the air purge line 70 is opened. These actions enable the sulphur dioxide feed line 20 and the reactor 14 to heat up quickly.

The water pump 32 (P1) is activated, thereby flowing water through the filters 34 to the water ejectors 26 and 48, and a reactor pressure timer starts. The water pressure is sensed by pressure sensor PS-5 to ensure that the water pressure downstream of the filters 34 exceeds about 150 psig. In the event that such a pressure value is not sensed, then the plant shuts down.

Under the influence of the flow of water by line 28, the water ejector 26 draws a vacuum on the reaction tower 14 and the water passes to drain by line 76. The pressure in the line 24 is sensed by pressure sensor PS-4 and if the predetermined vacuum value of less than about 100 mm Hg is not attained within a predetermined time period after start of the water pump, typically 3 minutes, as determined by the reactor pressure timer, as a result of air leaks, lack of water or filter blockage, then the plant shuts down.

At the same time that the heater 54 (Q1) is activated, a sulphur dioxide preparation timer starts. The combined action of the water ejector 26 and the open valve EV-3 permits warmed air to be drawn through the second sulphur dioxide expansion chamber 68 and thence through the reaction tower 14 to warm the same to the required reaction temperature. If the following conditions do not exist after a predetermined period of time from start-up of the heater 54 (Q1), typically 3 minutes, as determined by the sulphur dioxide preparation timer, then the plant shuts down:

| Expansion chamber temperature | not less than 50° C. | TS-2 |
| --- | --- | --- |
| Expansion chamber pressure | not more than 100 mm Hg | PS-3 |
| Reaction tower temperature | not less than 50° C. | TS-5 |

Assuming that the desired conditions have been attained, then the valve EV-3 is closed. During the production of chlorine dioxide solution, temperature sensors TS-2 and TS-5 continuously sense the respective temperatures and if the sensed value is outside the required range, the lockout procedure is activated. Additionally, pressure sensors PS-3 and PS-4 continuously sense the respective pressures and if they are outside the required range, then the system lockout procedure is activated.

The plant is now ready for chlorine dioxide production. Valve EV-1 in the sodium chlorate solution feed line opens and chlorate metering pump P2 starts. A chlorate flow timer starts and if the flow of sodium chlorate solution in line 16 is not sensed by flow sensor FS-1 within a predetermined period of time, typically 2 minutes, or if no flow is sensed at any time during chlorine dioxide solution production, then the system lockout procedure is activated.

When flow of sodium chlorate solution is present, sulphur dioxide feed valve EV-2 opens to initiate chlorine dioxide production. After a short delay to permit chlorine dioxide formation to commence, valve EV-5 opens establishing communication between line 40 and the storage tank 42 and permitting chlorine dioxide solution to pass out of the module 12 to the storage tank 42, the flow through drain line 76 then ceasing.

As noted above several parameters are monitored continuously to ensure that they remain within predetermined limits during chlorine dioxide production. These parameters are summarized below:

| Sulphur dioxide expansion chamber temperature | TS-2 |
| --- | --- |
| Reactor liquor temperature | TS-5 |
| Reactor pressure | PS-4 |
| SO$_2$ expansion chamber pressure | PS-3 |
| Chlorate flow | FS-1 |
| Water pressure | PS-5 |

In addition to those parameters, several other parameters are also continuously sensed to indicate any abnormality and these other parameters are as follows:

| Chlorate storage temperature | TS-1 |
| --- | --- |
| Off-gas temperature | TS-4A and 4B |
| Reactor differential pressure | PS-7 |
| Chlorate inventory level | LS-1 |
| SO$_2$ inventory level | PS-1 |

If during the production of chlorine dioxide solution by the plant 10, any one of those sensors detects a value outside the required range specified above, then the system lockout procedure is initiated. The control circuit, typically housed in a control panel 78, may include light sequencing for ready detection of the source of malfunction in the event of system shutdown. Audible signals of malfunction also may be provided. These checks ensure automatic fail-safe operation.

When the level of chlorine dioxide solution in the storage tank 42 reaches the desired inventory level as detected by level sensor LS-3, usually about 85% of the maximum storage capacity of the storage tank 42, a shutdown sequence is initiated which reverses the above-described start-up procedure. This shutdown procedure is not indicated on the logic flow diagram of FIG. 3 since this will be readily apparent from the logic sequence on initiation.

In the event that detection of the desired inventory level by LS-3 does not initiate shutdown, an additional level sensor LS-4 is provided to detect abnormally high inventory, such as, at about 95% of the maximum storage capacity of the storage tank 42, which then initiates lockout shutdown.

A timed purge operation, lasting typically about 5 minutes, characterizes the last phase of normal or abnormal shutdown. Upon initiation of the purge sequence using a purge timer, water purge valve EV-8 opens, air purge valve EV-3 opens, water pump P1 starts and chlorate metering pump P2 starts.

Water flowing to the water ejector 26 under the influence of pump P1 causes flushing air to be drawn through the gas flow lines and the tower 14 to purge the same. The air is vented to atmosphere by line 38 and the water overflows to drain by line 76.

Water flowing in the chlorate feed line 16 under the influence of pump P2 flushes the chlorate line and also washes liquid material from the tower 14. Water flowing to the water ejector 48 under the influence of pump P1 causes the liquid effluent to be removed from the reactor tower 14 and discharged to drain by line 52.

Warmed air and water are used in the flushing sequences so that less heat needs to be provided to the system on a subsequent start-up.

When the required purges are complete, as determined by the purge timer, pumps P1 and P2 are shut off and valves EV-3 and EV-8 are closed. When the plant is shut down in response to normal operating conditions, the plant is in a standby condition, awaiting either manual reset or initiation resulting from a sensed low chlorine dioxide solution level in storage tank 42 by sensor LS-2. When the plant is shut down as a result of abnormal conditions, the plant cannot be restarted unless manually reset after connection of the abnormal condition which caused the shutdown.

An additional pressure sensor PS-6 is associated with the expansion chamber 68. This pressure sensor causes valve EV-7 to open to vent sulphur dioxide if a pressure exceeding 15 psia is sensed in the expansion chamber, so as to prevent liquid sulphur dioxide from entering the reaction tower 14.

The plant 10, therefore, employs a compact equipment module 12 which requires only hook-up to a sodium chlorate solution storage tank 18, liquid sulphur dioxide storage cylinders 22, a water feed line 28, a chlorine dioxide solution storage tank 42, a source of electrical power and drains by lines 52 and 76. This module 12 is readily assembled at a remote location in compact form, as seen in FIG. 2, and shipped to the site of use of the chlorine dioxide solution.

The plant 10 produces substantially chlorine-free chlorine dioxide solution for use in waste water treatment and operates automatically in response to low inventory levels or can be manually activated, if desired. The plant 10 has built-in safety checks to ensure proper function and an automatic shutdown sequence in combination with audible and visual signals, in the event of any malfunction and an automatic shutdown sequence in the event of any malfunction.

The plant 10 is substantially maintenance free, requires only external services of electrical power and water for operation and requires only periodic checks of chlorate and sulphur dioxide inventories by a single non-skilled operator to be operational.

EXAMPLE

A small scale plant of the type described above with respect to FIGS. 1 to 3 was operated to produce an aqueous chlorine dioxide solution having a concentration of 3 g/l. The reactor 14 was operated at a temperature of 60° C. and a pressure of 100 mm Hg. The following parameters resulted, per pound of chlorine dioxide produced.

|  | lb/lb $ClO_2$ |
|---|---|
| Chemical usage: | |
| $NaClO_3$ | 2.35 |
| $SO_2$ | 2.616 |
| Spent acid: | |
| $H_2SO_4$ | 0.92 |
| $Na_2SO_4$ | 3.04 |
| $NaClO_3$ | 0.07 |
| Services: | |
| Water | 45 USG |
| Power | 10 kW |

SUMMARY OF DISCLOSURE

In summary of this disclosure, the present invention provides an improved automated procedure for formation of chlorine dioxide solution for use in waster water treatment. Modifications are possible within the scope of this invention.

What I claim is:

1. An automated chlorine dioxide-producing plant, comprising:

a chlorine dioxide-forming reactor comprising an upright tubular gas-liquid countercurrent contact tower having an upper end and a lower end;

first feed conduit means communicating with said upper end of said tower for feed of aqueous sodium chlorate solution thereto, sodium chlorate storage tank means in communication with said first feed conduit means, sodium chlorate solution pump means located between said sodium chlorate solution storage tank means and said first conduit means, and first selectively operable valve means located between said sodium chlorate solution storage tank and said sodium chlorate solution pump means;

second feed conduit means communicating with said lower end of said tower for feed of gaseous sulphur dioxide thereto and liquid sulphur dioxide storage means in communication with expansion chamber means for converting liquid sulphur dioxide to gaseous sulphur dioxide and communicating with said second feed conduit means, whereby sodium chlorate solution flowing downwardly in said tower countercurrently contacts upwardly-flowing sulphur dioxide to cause reaction therebetween to form chlorine dioxide gas and liquid byproduct;

gaseous product conduit means communicating with said upper end of said tower for removal of said gaseous chlorine dioxide therefrom and liquid product conduit means communicating with said lower end of said tower for removal of said liquid by-product therefrom;

first water ejector means communicating with said gaseous product conduit means, first water conduit means communicating with said water ejector means for flow of water thereto, whereby said first water ejector means subjects said tower to subatmospheric pressure through said gaseous conduit and water contacting said chlorine dioxide in said first water ejector means forms an aqueous chlorine dioxide solution therefrom, aqueous chlorine dioxide solution conduit means communicating with said first water ejector means, chlorine dioxide solution storage means communicating with said aqueous chlorine dioxide solution conduit means, and second selectively operable valve means located between said chlorine dioxide solution storage means and said aqueous chlorine dioxide solution conduit means;

second water ejector means communicating with said liquid product conduit means, second water conduit means communicating with said second water ejector means for flow of water therethrough, whereby said second water ejector means applies a suction to the lower end of said tower to remove said liquid by-product therefrom through said liquid product conduit means and to dilute the same, and aqueous effluent conduit means communicating with said second water ejector means;

water pump means having an upstream side and a downstream side adapted to communicate on its upstream side with a source of water and communicating on its downstream side in parallel with said first and second water ejector means through respective first and second water conduit means;

heater means in heat exchange relationship with said second feed conduit means for heating sulphur dioxide passing therethrough, air conduit means in heat exchange relationship with said heater means and communicating with said second feed circuit means downstream of said heat exchange relationship between said second feed conduit means and said heater means, and third selectively operable valve means in said air conduit means;

flush water conduit means in heat exchange relationship with said heater means and communicating with said water pump means and said first feed conduit means, and fourth selectively operable valve means in flush water conduit means;

first level sensor means for sensing a predetermined lower level of chlorine dioxide solution in said chlorine dioxide solution storage tank corresponding to a level at which production of chlorine dioxide solution by said plant is required to commence, and second level sensor means for sensing a predetermined upper level of chlorine dioxide solution in said chlorine dioxide solution storage tank corresponding to a level at which production of chlorine dioxide solution by said plant is required to cease;

first temperature sensor means for sensing the temperature of sodium chlorate solution in said sodium chlorate solution storage tank, second temperature sensor means for sensing the temperature of sulphur dioxide gas in said second feed conduit means downstream of said communication with said air feed conduit means, third temperature sensor means for sensing the temperature of chlorine dioxide gas in said gaseous product conduit means, and fourth temperature sensor means for sensing the temperature of liquid by-products at the lower end of said tower;

first pressure sensor means for sensing the pressure of liquid sulphur dioxide in said sulphur dioxide storage means, second pressure sensor means for sensing the pressure of chlorine dioxide gas in said gaseous product conduit means, third pressure sensor means for sensing the differential pressure between the upper end and lower end of said tower, fourth pressure sensor means for sensing the pressure of sulphur dioxide gas in said second feed conduit means at the location of said second temperature sensor means, and fifth pressure sensor means for sensing the pressure of water on said downstream side of said water pump means;

flow sensor means for sensing flow or no flow of sodium chlorate solution through said first feed conduit means; and means selectively actuating each of said selectively-actuable valve means in predetermined manner in response to predetermined parameters sensed by said sensors.

* * * * *